United States Patent Office 3,418,550
Patented Dec. 24, 1968

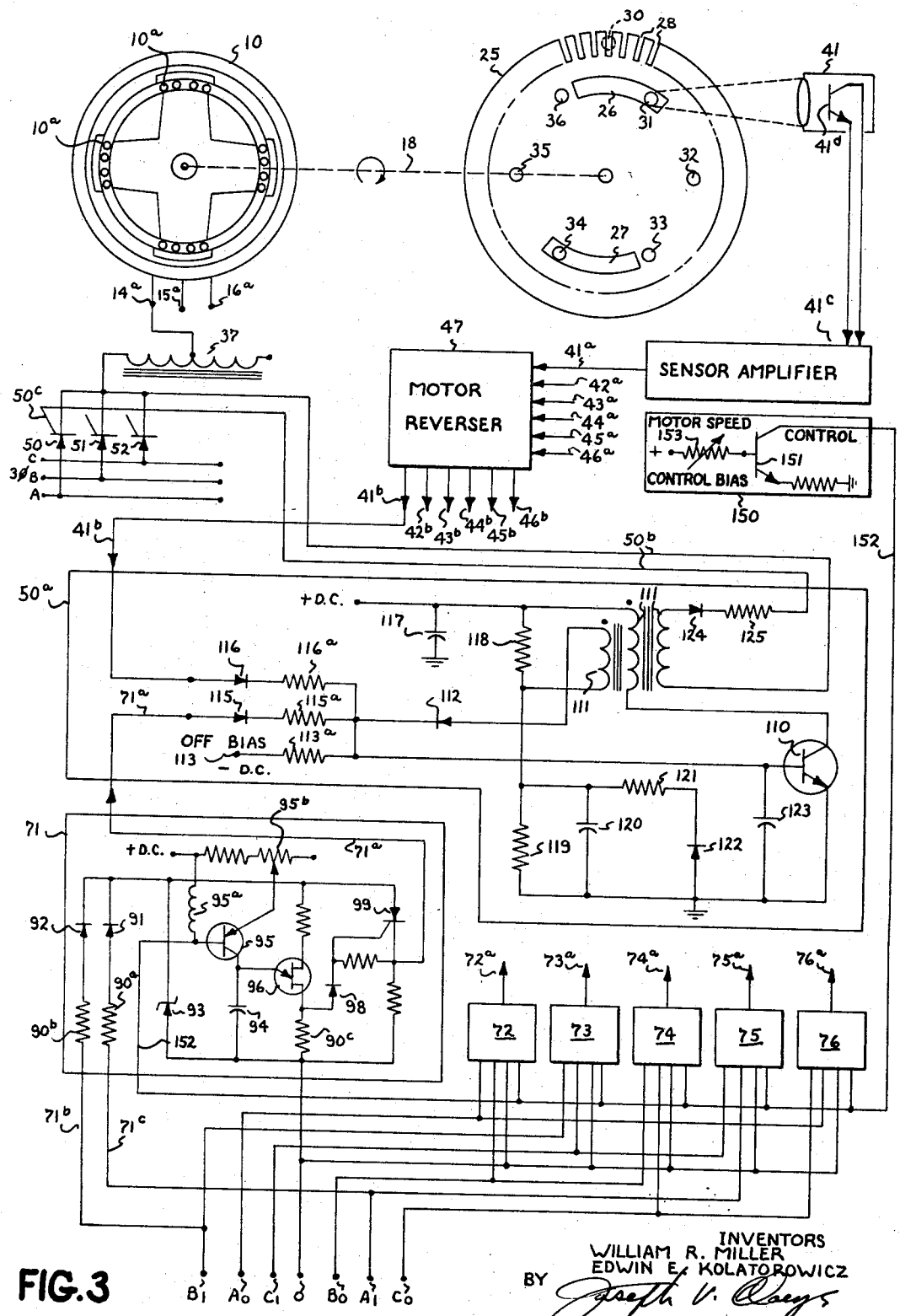

3,418,550
BRUSHLESS ADJUSTABLE SPEED DRIVE
Edwin E. Kolatorowicz and William R. Miller, Erie, Pa., assignors to General Electric Company, a corporation of New York
Filed June 14, 1966, Ser. No. 557,395
11 Claims. (Cl. 318—138)

This invention relates to improvements in brushless adjustable speed motor drive systems, and more particularly relates to adjustable speed drives of the general type described in an article entitled "The Thyratron Motor," published by Alexanderson and Mittag in Electrical Engineering, November 1934, pp. 1517–1523. The present invention provides improved circuit means for energizing a motor from alternating current lines to provide drive characteristics resembling the conventional combination of controlled rectifiers supplying current to a DC motor, but the motor in the present disclosure being without brushes, commutators or slip rings.

The present invention employs solid-state circuitry which performs the two basic functions performed by thyratrons in the above-mentioned article, namely: First, a commutating function in which current to the motor is switched at the correct moment with respect to the position of the motor shaft so that current is delivered to the correct motor winding in the correct flow-direction to maintain the necessary torque; and second, the function of controlling the average voltage that is applied to the motor windings by phase control of the current flowing directly from a multi-phase power source whose frequency is independent of the motor speed.

Since the average angular relationship between the stator and rotor field is maintained approximately constant in carrying out the shaft-position commutating function, adjusting of the average armature voltage permits adjusting the speed in the same way as adjusting the armature voltage of a conventional direct current motor. The present system, therefore, provides an adjustable speed drive system supplied directly from an AC supply line but exhibiting essentially the same speed and torque characteristics as an ordinary direct current motor drive, and without requiring any mechanical commutator or other type of mechanical contact means. That is, the system provides a brushless drive having a torque which is proportional to current, and a speed which is proportional to the average voltage. The shaft-position commutating function is controlled by feedback of shaft-position information delivered to solid-state switching means from position-sensing means, several types of which have been suggested in the prior art relating to brushless DC motors, including: magnetic sensing devices, hall-effect devices, capacitive devices, photoelectric devices, etc. The present invention is described herein in terms of an illustrative embodiment using photoelectric sensing of the motor shaft position, although the invention is not limited to this particular sensing means, as will appear hereinafter.

With respect to the function of controlling the average voltage in the present drive-circuit configuration, the illustrative embodiment of this invention employs plural silicon-controlled rectifier devices (SCR) connected to couple any phase of the AC power lines to any selected motor windings as may be instantaneously required to maintain the rotating armature flux. This selective determination is based upon novel trigger circuitry which is controlled partly by phase controls referenced to the AC power supply and partly by shaft-position sensors. In this connection, it is important to note that the AC power line frequency and the rotation rate of the motor are mutually independent in the present drive system.

The present invention has for its object not only the elimination from the system of motor-brushes, commutators, and/or slip rings with the resulting well-known advantages of such elimination, but also the provision of a practical drive system capable of supplying considerable power, for instance in the range of 5 to 100 (or more) horsepower, while being competitive with known drive systems both as to size and original cost, and as to efficiency with respect to power consumption, maintenance, and reliability.

The particular type of motor used in the present illustrative example has been selected for the purpose of eliminating any need to transfer current into rotating windings, this motor having a permanent-magnet rotor and a stationary armature including plural windings which are externally commutated in order to provide a rotating field whose rotation is controlled by the shaft-position sensor to lead the rotor by about 90 electrical degrees within the motor speed range. There are a number of different motor structures that can be used. For instance the permanent-magnet rotor can be replaced by a wound salient-pole structure. To eliminate slip rings, a coaxial transformer can be used to transfer alternating-current power to the rotating member, and rectifiers mounted directly on it can perform the required conversion to direct current. While it would be desirable to achieve the commutating resolution obtainable in conventional DC motors by using a large number of commutator bars, it is not practical to use such a large number of solid-state switches resulting in undue complexity of the external circuit and uneconomical utilization thereof. The present illustrative embodiment employs armature windings having only three input leads for a four pole motor. This permits at least six discrete conduction combinations for each one-half revolution of the motor.

Since the voltage obtainable at the commutating means has a ripple component which is a function of the power line frequency, it is desirable to smooth this ripple as much as possible after selection of the phases of the power line which are momentarily coupled to the windings of the motor. This smoothing can be accomplished in any suitable manner such as by the insertion of a multi-winding reactor in the commutating and phase selecting means, such reactor serving a function similar to that of a DC reactor which is frequently used with SCR power supply systems to improve motor commutation and for smoothing purposes. The reactor also serves to limit short circuit current in the case of faulty commutation of the SCR's.

It is another important object of the present invention to combine the functions of power-line phase selection with the shaft-position commutating function to provide circuitry in which the same SCR's participate in both functions. This efficient combining of several functions using the same SCR's is accomplished in a novel way by controlling the individual SCR's with logical-gating means having multiple inputs which determine the presence of a single output to control one of the SCR's. In the illustrated embodiment each of these gating circuits comprises a blocking oscillator whose output when present triggers one SCR, but whose triggering is controlled by multiple inputs, one of which is enabled by the rotor position sensing means, and others of which are enabled by phase-controlled means which are referenced to the power line. When the shaft position is correct for a particular winding to be energized, all of the oscillators which control current flow in that winding are partially enabled at one input. However, the particular SCR which is then triggered is the one which is selected by the phase-control means. The time in the power-line cycle at which the SCR is fired is also controlled to adjust the average voltage supplied to the armature windings and hence the speed of the motor.

One of the circuitry improvements of the present invention resides in the use of said gated blocking oscillators to control each of the SCR's. These oscillators put out narrow pulses of low energy content which are quite sufficient to trigger the control electrode of an SCR. The oscillator circuitry, however, is such that its output cannot exceed the designed-for level which is selected to be harmless to the SCR regardless of how many pulses it delivers to it. Although one pulse is sufficient to render the SCR conductive, it is convenient to have each gate control an oscillator be rendering it either blocked, or free-running. The SCR is turned off when the phase-leg it controls reverses polarity, or it is commutated off by the action of the motor counter EMF, and is turned on again only when the gating circuit unblocks it when it is desired that it again be conducting. When unblocked, an oscillator delivers a train of pulses to the SCR so long as the latter should conduct, and the rate of these pulses is made high with respect to the rotation rate of the motor or the frequency of the power line so as not to introduce triggering delays in the system.

There is the further problem of reducing the commutating reactance of the motor as much as possible, this being a problem also with other commutated DC motors as well as with the present system. A good machine should have high flux density and prooprtions which will minimize reactance. It has been found that the use of amortisseur bars in the form of heavy conductors located in the pole shoes and linked together by heavy rings reduces the commutating reactance by about 50%.

The particular shaft position sensing means included in the present illustrative embodiment has been selected because it has certain advantages. With a machine having three stationary windings, six different positions of the rotor must be sensed for each pair of poles to effect proper power supply switching, because of the fact that in the present system there are two groups of SCR's connected with each stationary winding, one group at each terminal permitting the flow of current into the winding and the other group at each terminal permitting the flow of current away from the winding at that terminal. It is an important advantage to permit two-way current flow in the motor windings so as to permit more complete utilization thereof.

In the embodiment selected for illustration in this disclosure, the rotor position sensors themselves comprise photo transistors spaced around a circuit board and facing in the direction of oppositely located light sources placed on the other side of an interposed light chopper which is turned by the motor shaft. This chopper is in the form of a disk having apertures through which the light sources, such as lamps, light emitting semiconductors or the like, can illuminate the phototransistors. The six outputs per pair of motor poles can alternatively be generated by three sensors which are then connected to logic means suitable for decoding six position-indicating outputs. Amplifying means attached to each position sensor provides an output signal whenever an aperture in the light mask disk is opposite the associated phototransistor. The amplifier connected to that transistor then delivers an enabling signal to a suitable firing circuit means, such as a blocking oscillator, to control the gate inputs to enable those gates to trigger the particular SCR's which can furnish such current as is required by each stationary winding according to the momentary position of the rotor. The rotating chopper disk can also conveniently be provided with a plurality of slits around its periphery which pass between an auxiliary light source and phototransistor for the purpose of providing tachometer pulses, for instance at the rate of 120 pulses per revolution of the disk.

It is an important advantage of the present system that reversal of the direction of rotation of the rotor does not require any changes in the connections of the power conducting leads, such reversal being achieved solely by switching the sequence of the position sensor output pulses so as to reverse the sequence of rotation of the stationary armature field. This is accomplished most easily at phase advances of 0, 30° or 60°. It can also be done at other phase advances, although the circuitry becomes more complex.

Summarizing, it is the object of this invention to provide an improved adjustable speed drive system of the type operating directly from multiple-phase power lines without requiring mechanical commutators or brushes; to provide a motor drive which can operate without special enclosures in adverse or dangerous atmospheres; to provide a drive system which reliably provides a great range of speed control all the way from zero to relatively high r.p.m., and which includes dynamic braking characteristics, while delivering relatively large amounts of power, for instance in the range of 5 to 100 (or more) horsepower; and further to provide a system which is readily reversed without requiring power-line reconnections.

Other objects and advantages of the present invention will become apparent during the following discussion of the drawings, wherein:

FIG. 3 is a partial diagram corresponding with a portion of FIG. 1 and FIG. 2, and showing in more schematic detail the circuitry required to drive a motor winding for one illustrative motor shaft position and one power line phase condition.

Figure 1:
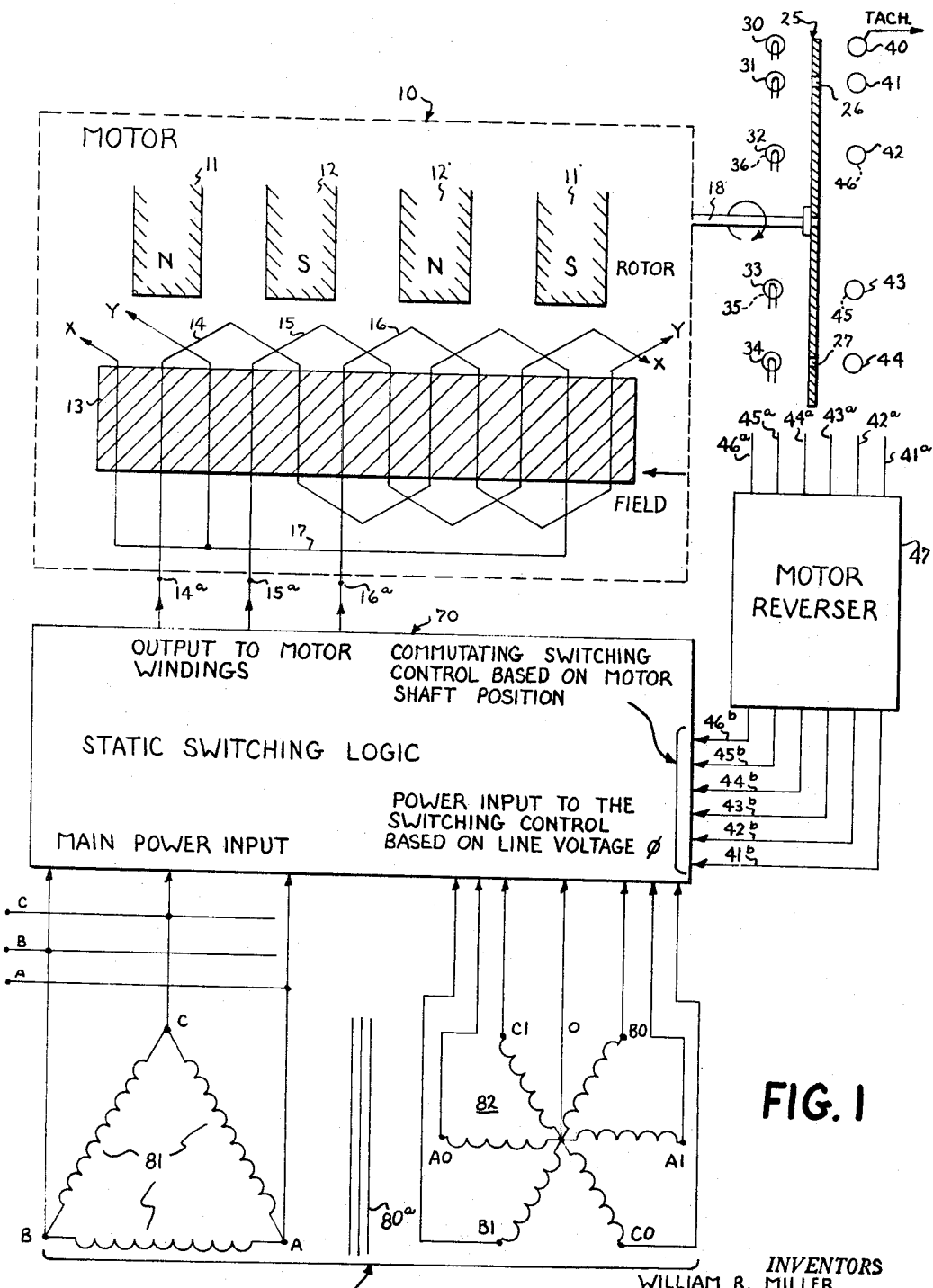
FIG. 1 is a block diagram illustrating the motor windings in relationship to the drive circuitry which performs the dual function of motor commutating according to shaft position, and of AC-power-line switching according to instantaneous phase thereof.

Referring now to FIG. 1, the present illustrative embodiment shows a motor 10 having a rotor including permanent field magnets 11, 11' and 12, 12'. The armature 13 of this motor is stationary, and is provided with three windings 14, 15, and 16 each of which has one end connected to a common bus bar 17, the other ends of these windings being connected to armature terminals 14a, 15a and 16a. The rotor drives a shaft 18, the direction of rotation of which is reversible, as will be discussed hereinafter.

In order to sense the momentary angular position of the motor shaft 18 in this illustrative embodiment, the shaft is connected to rotate a light chopping disk 25 which can be seen also in FIG. 3. This disk has two arcuate apertures 26 and 27 therethrough. On one side of the disk are located six light bulbs 31, 32, 33, 34, 35 and 36 which are spaced around the center of the disk and at a radius such that the light therefrom can shine through the slot 26 or 27 when one of the slots is in register with a light bulb. The disk also has an annular series of slot apertures 28 spaced around its periphery, which cooperate with a light source 30 and with light-sensitive means 40 to provide tachometer pulses as the light from the source 30 is chopped while passing through the tachometer slots 28 as they move past it. All of these light bulbs are continuously illuminated from a power source (not shown). Opposite each of the light bulbs 31–36 and on the other side of the disk 25 therefrom are located a series of light-sensitive transducers labeled 41, 42, 43, 44, 45 and 46, and these transducers are connected to sensor amplifier circuits, such as 41c in FIG. 3, designed to deliver a signal when the transducer is illuminated by the corresponding bulb shining through an aperture 26 or 27 in the disk 25. This shaft-position sensor circuitry will be further discussed hereinafter, it being sufficient at this stage in the description to state that there are six outputs therefrom which are energized in such a succession as to produce the desired commutation sequence in the solid-state circuitry to be described hereinafter. These outputs appear on wires 41a, 42a, 43a, 44a, 45a, and 46a which are fed into a motor-reverser switch 47 which merely changes the sequence in which the input wires 41a through 46a are connected to corresponding output wires 41b through 46b.

The power to drive the motor 10 is supplied thereto, not from a DC source, but directly from a multi-phase AC power line including phases A, B, and C. Because of the fact that the rotation rate of the shaft 18 is not in any way related to the frequency of the AC power line, the present invention must provide line-phase switching means by which the voltage delivered to the armature windings 14, 15 and 16 from the AC power lines is instantaneously selected by phase-control means to have the correct polarity, and also to be coupled to the winding at a phase instant which is correct to provide the average armature voltage necessary to maintain the selected motor speed. In the illustrative embodiment, both this phase-selecting function and also the shaft-position commutating function are carried out by eighteen silicon-controlled rectifiers (SCR) bearing the reference numerals 50 through 67. These SCR's are selectively rendered conductive, several at a time, by a novel switching-logic system 70, FIG. 1, which takes the phase-information from the power line and also the shaft-position information from the photo sensors and then selects and triggers the appropriate SCR's.

The triggering of each SCR is accomplished by a blocking oscillator unit, respectively labeled 50a, 51a, 52a, 53a, 54a, 55a, 56a, 57a, 58a, 59a, 60a, 61a, 62a, 63a, 64a, 65a, 66a, and 67a. A typical trigger oscillator 50a is shown in detail in FIG. 3, and will have its circuit hereinafter discussed.

In order to determine the momentary phase condition of the power line, transformer means is used as a part of a phase-sensing expedient. At the convenience of the circuit designer, either three separate transformers can be used, one for each phase, or a single three-phase transformer can be used. The present illustrative embodiment is of the latter type, and uses a phase-sensing transformer 80 which has its primary windings 81 delta-connected to the power line, and has star-connected secondary windings 82 including a neutral center labeled 0, and six windings whose outer terminals are respectively labeled $A_0A_1$, $B_0B_1$, and $C_0C_1$. The primary and secondary windings are magnetically coupled through a permeable core 80a, so that the outputs at the above listed six terminals of the secondary 82 have amplitudes and polarities which change instantaneously as the power lines A, B and C proceed through their 60 cycle phase sequence. The outputs at these six terminals of the secondary 82 are used to supply information to the switching-logic means 70 by which it can determine which phase legs should be supplying power to the armature through the SCR's at any particular instant of time.

Figure 2:
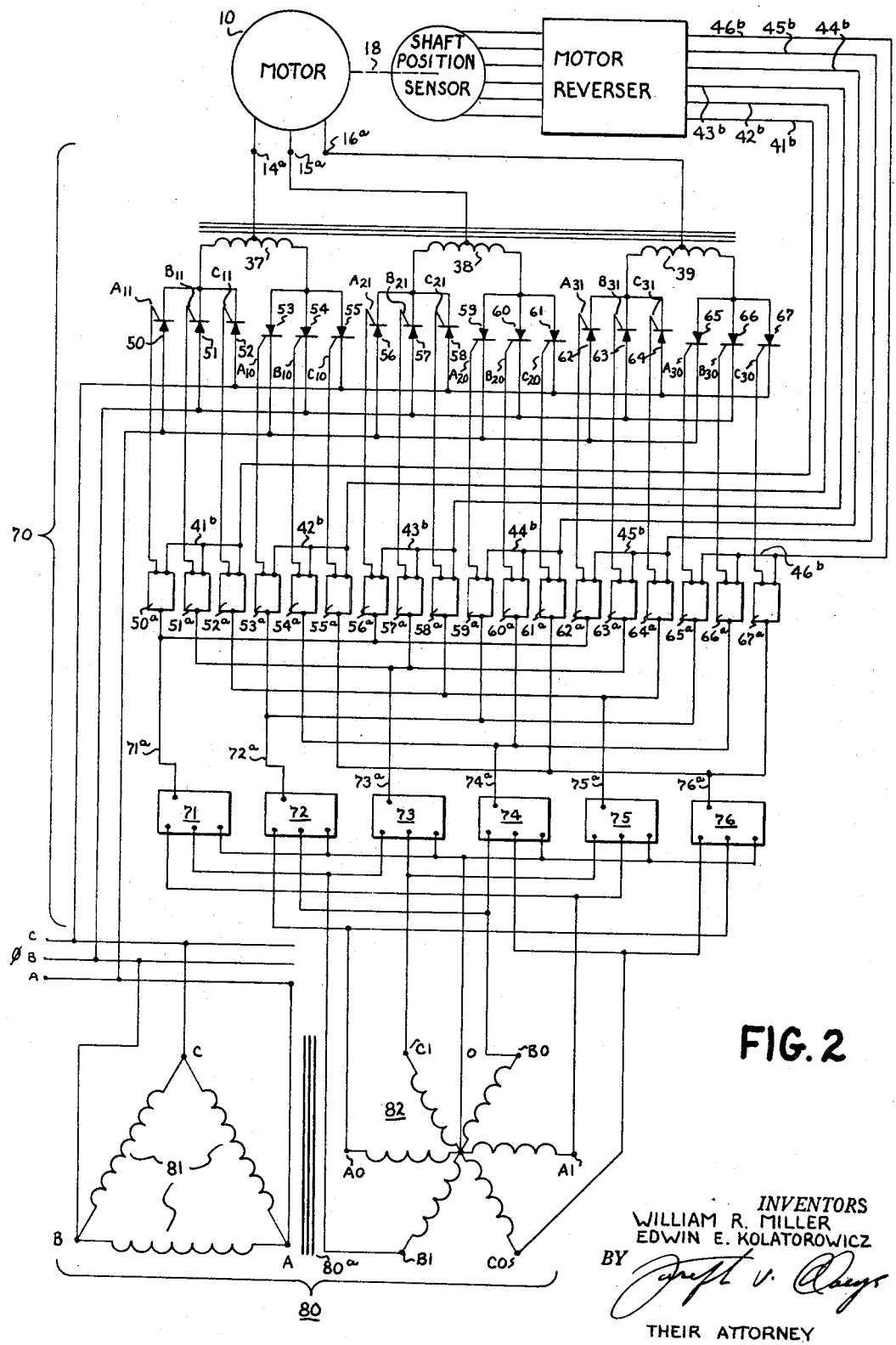
FIG. 2 is a diagram similar to FIG. 1, but showing in greater detail the switching circuitry, broken down into individual units.

These outputs $A_0A_1$, $B_0B_1$, and $C_0C_1$ are connected as shown in FIGS. 2 and 3 to control circuits 71, 72, 73, 74, 75 and 76, the first of these circuits being shown in detail in FIG. 3, and the other control circuits being of the same design. Each control circuit has one output, these being respectively labeled 71a, 72a, 73a, 74a, 75a, and 76a, and each of these outputs is connected to an input to a different oscillator trigger circuit 50a through 67a as shown in FIGS. 2 and 3. Each oscillator trigger circuit 50A through 67a is controlled by a gate having two inputs, one input providing it with a phase-control signal referenced to the power line, and the other input providing it with motor-shaft position information. Whenever, and as long as, both of these inputs are above a certain level, the oscillator trigger fires and continuously delivers a train of pulses through its output wire, 50b through 67b respectively, to trigger the corresponding SCR and cause it to connect a power line phase A, B, or C momentarily to the motor winding to which the triggered SCR is coupled. The component values are chosen so that the presence of both a shaft position signal and a phase-control signal are required at the gate before the oscillator will break into oscillation.

The illustrated eighteen SCR's are connected together in groups of three so that there are a total of six groups, each one of which is partially under the control of one of six sensor outputs 41b, 42b, 43b, 44b, 45b, or 46b for motor-commutation urposes. These six groups are shown in detail near the top of FIG. 2, and connect respectively to opposite ends of three reactor windings 37, 38, and 39 all wound on a common core. The left ends of the reactor windings 37, 38, and 39 are wired to SCR groups connected with similar polarities to pass current toward the corresponding motor winding, and the right ends of the reactor windings 37, 38, and 39 are connected to oppositely-poled groups of SCR's arranged so as to conduct current away from the corresponding motor windings toward the associated power lines. By this means, current is permitted to flow in both directions through each motor winding, thereby utilizing the copper most efficiently.

The reactor windings 37, 38, and 39 are provided for the purpose of assisting in the commutation of the SCR's and of smoothing the ripple appearing on the input voltage from the power lines. They also serve to limit short-circuit current in the event of faulty SCR commutation. All these windings should be very closely coupled so that motor leg commutation is not impeded. The motor commutation is further assisted by amortisseur bars 10a inserted in the motor in the manner illustrated in FIG. 3, these bars serving the purpose of reducing the commutating reactance appearing at the motor winding terminals 14a, 15a, and 16a in a manner which is well-known in the motor art.

As the motor 10 rotates, the disk 25 rotates with it and exposes the sensor transducers 41 to 46 in sequence to the light bulbs 31–36 so that one or more of them will be illuminated at any particular moment of time. Each of the transducers is coupled with an amplifier circuit, for instance as shown at 41c in FIG. 3. The light entering the transducer 41 reduces the resistance of the phototransistor 41d and causes a positive output voltage to appear at the output of amplifier 41c at wire 41a, this voltage remaining so long as the transistor 41d is illuminated and being coupled through diode 116 to raise the DC potential on the base of transistor 110 part-way toward a level sufficient to sustain oscillation by partly overcoming the negative back-bias applied to the base through resistor 113a. Oscillations occur when further positive potential is applied through diode 115 from the phase sensor circuit 71.

The phase control circuits 71–76 all operate with reference to a neutral potential connection at the center point 0 of the star-connected secondary 82. In addition each one of the phase control circuits 71–76 is connected to two outer ends of star windings, for instance as shown by the wires 71b and 71c below the box 71 in FIG. 3. The circuit within this box is thus connected to terminals $A_1$ and $B_1$ of secondary 82, and the instantaneous potentials of these terminals are delivered through current-limiting resistances 90a and 90b to diodes 91 and 92. When the phase in the secondary 82 is such as to make the terminal $A_1$ positive, current flows through the diode 91, thereby applying a positive potential across a Zener diode 93. Similarly, when terminal $B_1$ becomes more positive than the potential across this Zener diode, current can flow through the diode 92 to cause a relatively smooth transfer of power from terminal $A_1$ to terminal $B_1$. Because of the phase relationships of terminals $A_1$ and $B_1$ and because of the regulating effect of Zener diode 93 there appears an essentially square wave of constant voltage across Zener diode 93 approximately 300 degrees of the line frequency wide, and this acts as a source of operating potential for unijunction transistor 96 and SCR 99. The charging rate of a capacitor 94 is controlled by valve means comprising a transistor 95 and associated base resistor 95a and collector resistors 95b. When the voltage across capacitor 94 reaches a sufficient value, the unijunction 96 is rendered conductive, thus discharging capacitor 94 and applying a pulse across the resistor 90c. This pulse is coupled to the gate of a small SCR 99 by diode 98. The SCR 99 is turned on and output voltage appears on wire 71a. Later on, the SCR 99 is turned off when the 300° square wave drops to zero. When the SCR 99 is turned on positive pulses appear on wire 71a, but the beginning of each pulse is delayed by the action of transistor 95. This delay affects the width of the pulses, and therefore the "on"-time of SCR 99 is a function of the delay. The delay is inversely determined by the amount of forward bias applied to the base of transistor 95 via the line 152 leading from the speed control box 150. The speed control box 150 contains a transistor 151 whose base connects to a source of control schematically represented by potentiometer 153, which in a practical system might be a speed sensing or regulating device having an analog output. The more positive the analog signal applied to the base, the more negative the base of transistor 95, and therefore the more quickly it charges the capacitor 94. The sooner 94 reaches the trigger voltage level required to discharge the unijunction 96, the sooner the SCR 99 will be triggered on. Thus a signal will appear on the wire 71a, thereby making the SCR 50 conductive earlier with respect to the line frequency. As a result, the average voltage applied to motor winding 14 will be increased, thereby raising the motor speed.

The phase control 71 thus delivers continuous potential to a firing circuit means, illustrated as a blocking oscillator trigger circuit, until interruption of conduction of that particular SCR is required by changing motor position, which in turn requires triggering of a different SCR associated with the same line phase but a different motor winding.

Each oscillator trigger circuit, of which 50a is typical, comprises a blocking oscillator including a transistor 110 driving the center winding of a feedback transformer 111. If no back-bias were applied through resistor 113a, to block the oscillator, the circuit would free-run as follows. As the voltage across the parallel combination of resistor 119 and capacitor 120 rises toward a level set by the divider including resistors 118 and 119, it reaches a sufficient value to forward bias transistor 110 so that current flows into the center winding of transformer 111. The left-hand winding of transformer 111 is connected in such a manner as to provide positive feedback which drives the transistor into saturation rapidly. As transformer 111 saturates the current in the feedback winding decreases so that the current in the center winding decreases also. The collapse of the current in the feedback winding causes the voltage across capacitor 120 to reverse. The degree of reversal is controlled by the relative values of resistors 118, 119 and 121. Capacitor 120 then starts to charge again by drawing current from the positive DC power supply. The rate is controlled by the relative values of reesistors 118 and 119. This charging rate essentially controls the repetition rate of the circuit, but the pulse width is determined mainly by the characteristics of the transformer 111. The repetition rate is set to be quite high with respect to the line frequency, say ten kilocycles per second.

The operation in practice is modified by the action of diodes 115 and 116 and associated resistors 115a, 116a, and 113a. These components comprise a two-input gate circuit having blocking bias applied through resistor 113a. If no positive signals are being applied to diodes 116 and 115, the negative DC power supply acting through resistor 113a and diode 112 clamps the base of transistor 110 so that the blocking oscillator does not function. The effect of the negative supply can be overcome by positive signals on wires 71a and 41b. The values of the signal voltages, bias voltage and resistors 113a, 115a and 116a are chosen so that signals must be present on both and-gate leads 41b and 71a to permit the oscillator to function. A decoupling capacitor 117 is used to prevent power-supply noise from causing the oscillator to be triggered, while capacitor 123 reduces the base-circuit sensitivity to noise. The output of the blocking oscillator is coupled through diode 124 and resistor 125 to the gate of the SCR 50 which it is to control. Each blocking oscillator is associated with and controls only one SCR.

*Operation*

There are three armature terminals 14a, 15a, and 16a, and current can flow into one or more of these terminals, but when it does it must flow out of at least one of the other terminals. As shown in FIG. 2, there are groups of three in-flowing SCR's connected to each terminal and groups of three out-flowing SCR's also connected to each terminal, and the position of the motor together with the instantaneous phase of the power lines determines which ones of the eighteen SCR's shall be conductive. It is the 10 kilocycle oscillators 50a through 67a which actually render the selected SCR's 50–67 conductive by continuously pulsing their trigger electrodes. These oscillators 50a–67a must have both their upper and lower inputs enabled before they can oscillate and deliver trains of trigger pulses to their associated SCR's.

Still referring to FIG. 2, assume that control circuit 71 has energized wire 71a, and that control circuit 74 has energized wire 74a. Thus, the lower input to the trigger oscillator 50a is energized, and this circuit will then deliver a train of pulses to SCR 50 providing the wire 41b is also energized by the shaft-position sensor 41. Assuming this to be true, the SCR 50 will be made conductive to deliver current from the power line phase A through inductance 37 to terminal 14a. If the motor is in such a position that current should be flowing out of winding 15a, the position sensor would also apply a signal to wire 44b. Since two signals are applied to trigger oscillator 60a, it will oscillate and deliver a train or trigger pulses to render the SCR 60 conductive.

The position sensor disk is arranged so that at least two phototransistors are illuminated at any time. The desired conduction in the motor can then be as follows:

| Rotation increment | Current in | Current out |
|---|---|---|
| 1 | 14a | 15a |
| 2 | 14a | 16a |
| 3 | 15a | 16a |
| 4 | 15a | 14a |
| 5 | 16a | 14a |
| 6 | 16a | 15a |

The above sequence repeats once per revolution for each pair of rotor poles. In the case of a four pole machine there are 12 combinations per revolution. Each rotation increment is then 30 mechanical degrees and each winding should be on for 60 degrees at a time.

In the above example assume the motor has rotated to a position where it becomes necessary to turn off current leaving terminal 15a, and instead to have it leave terminal 16a. The position sensor enables the wire 46b leading to the group consisting of SCR's 65, 66 and 67 while removing the enabling signal from the wire 44b leading to the group consisting of SCR's 59, 60 and 61. If the line voltages were still such that current should flow in from line A and out to line B, then the gate signal would disappear from SCR 60 and would appear on SCR 66. If the power line phase then advances, within the same increment of rotor rotation, so that the current should flow out to line C (instead of to line B), then SCR 66 would become non-conductive and the triggering pulses would transfer to SCR 67 in the same SCR group. Thus, the groups of SCR's which are enabled to handle in-and-out flow of current to a winding are selected by the rotor-position sensors at the top of FIG. 2; whereas the particular SCR's within those selected groups are chosen by the power-line phase control circuitry at the bottom of FIG. 2.

From the above description it is evident that there are two commutation processes involved. One is the transfer from one SCR to another in the same group due to power line phase conditions and the operation of the phase controls. This is exemplified in the foregoing description by transfer of out-flowing current from SCR 66 to SCR 67. The other process is the transfer of current from one motor leg to another. This leg-to-leg commutation is exemplified by the transfer from SCR 60 to SCR 66 which shifted the out-flowing current from leg 15a to leg 16a. Since an SCR that is rendered conductive will not revert to the non-conductive state by itself, leg-to-leg commutation must be assisted at high speeds. This is accomplished by utilizing the counter EMF of the motor. The position sensor is adjusted so as to enable the incoming group of SCR's at an instant when motor voltage is available for extinguishing the out-going SCR's from whose control electrodes the train of pulses has been removed. In the above example, the transfer from SCR 60 to SCR 66 is initiated by enabling the group consisting of SCR's 65, 66 and 67 when the voltage of motor terminal 16a is positive with respect to motor terminal 15a. The counter EMF will then tend to transfer the out-flowing current from SCR 60 to 66 and hence commutate the current from motor leg 15a to 16a.

The present invention is not to be limited to the exact illustrative embodiment shown and described herein, for changes may be made within the scope of the following claims.

What we claim as new and desire to secure by Letters Patent of the United States is:

1. In a variable-speed drive system for supplying power from a multi-phase AC power line to a motor including fixed armature windings and a field rotatable with the motor shaft, the system including plural semiconductor controlled rectifier devices each having a control electrode to trigger it into conduction and said controlled rectifier devices being connected from each of the phases of the power line to each of the armature-windings in two groups having opposite polarity directions, and the system further including shaft-position sensing means delivering sequential outputs during rotation of the shaft, improved means for selectively triggering the controlled rectifier devices to pass power-line current through the windings to maintain armature flux rotating at a rate independent of the power line frequency, comprising:
    (a) plural normally disabled firing circuit means each connected to the control electrode of at least one rectifier device and, when enabled, delivering a train of triggering signals thereto at a rate which is high as compared with the power line frequency;
    (b) gate means connected to each firing circuit means for enabling the latter when a first and second input to the gate means are both energized;
    (c) circuit means connecting each shaft-position sensing means output to the first inputs of all of the gate means which are associated with the same group of controlled rectifier devices;
    (d) phase-sensing means connected to the power line phases and including means for delivering separate outputs representing each phase whenever it has a predetermined polarity and amplitude; and
    (e) circuit means connecting the second input of each gate means to one of said phase sensing outputs.

2. In a variable-speed drive system for supplying power from a multi-phase AC power line to a motor including fixed armature windings and a field rotatable with the motor shaft, the system including plural semiconductor controlled rectifier devices each having a control electrode to trigger it into conduction and said controlled rectifier device being connected from each of the phases of the power line to each of the armature-windings in two groups having opposite polarity directions, and the system further including shaft-position sensing means delivering sequential outputs during rotation of the shaft, improved means for selectively triggering the controlled rectifier devices to pass power-line current through the windings to maintain armature flux rotating at a rate independent of the power line frequency, comprising:
    (a) plural normally-blocked oscillator means each connected to the control electrode of at least one rectifier device and, when enabled, delivering a train of triggering signals thereto at a rate which is high as compared with the power line frequency;
    (b) gate means connected to each oscillator means for enabling the latter when a first and second input to the gate means are both energized;
    (c) circuit means connecting each shaft-position sensing means output to the first inputs of all of the gate means which are associated with the same group of controlled rectifier devices;
    (d) phase-sensing means connected to the power line phases and including means for delivering separate outputs representing each phase whenever it has a predetermined polarity and amplitude; and
    (e) circuit means connecting the second input of each gate means to one of said phase sensing outputs.

3. In a system as set forth in claim 2, said phase-sensing means including transformer means having windings delivering current representing each phase and each polarity thereof, and each of said windings being coupled to an avalanche signal generating means; unidirectional means in the generating means poled to accept current from the attached windings during intervals when its polarity and amplitude are correct and to supply the current to power the associated generating means during said intervals; capacitor means charged through electronic valve means and connected to avalanche said generating means when the charge reaches a predetermined level, the capacitor means being discharged by said avalanche; and means to control the resistance of said valve means.

4. In a system as set forth in claim 3, the charging-rate valve means in each phase-sensing means having a control element; and the system including motor-speed control means comprising a variable bias source connected to all of said control elements to simultaneously determine the resistance of all of said valve means.

5. In a system as set forth in claim 3, said avalanche signal generating means comprising a controlled rectifier having a control element and connected to receive power from said unidirectional means and pass it through a load resistor to develop an output signal thereacross; and unijunction transistor means connected between said capacitor means and said control element to forward-bias the latter when the former reaches a predetermined charge level.

6. In a system as set forth in claim 5, each unidirectional means comprising a diode; and Zener voltage regulating means coupled to the output of said diode to limit the amplitude of the voltage of the power supplied to the controlled rectifier in the associated generating means to thereby standardize the amplitude of its output to the associated gate means input.

7. In a system as set forth in claim 6, each avalanche signal generating means having two diodes coupled to immediately successive phase windings of the transformer means, and said diodes delivering power into a common Zener means, whereby current is delivered from a diode to the Zener means only after its voltage level exceeds the level of the voltage maintained across the Zener means by the other diode.

8. In a system as set forth in claim 2, said rectifier devices each comprising a silicon controlled rectifier, and said oscillator means each comprising a blocking oscillator normally biased beyond cut-off and coupled to said gate means to be forward biased thereby, each oscillator when forward biased delivering to a control electrode a continuous train of narrow pulses at a high repetition rate.

9. In a system as set forth in claim 2, said circuit means for connecting said position-sensing outputs to said first inputs of the gate means including a motor reverser comprising switching means connected between said outputs and inputs to reverse the sequence of coupling of said output to said first inputs to reverse the direction of rotation of the armature flux.

10. In a system as set forth in claim 2, said power line having three phases and said motor having three armature-winding input terminals; two oppositely poled groups of three SCR's coupling each terminal to the three power-line phases, reactance means wound on a common core and respectively interposed between said terminals and the associated SCR's; the three oscillator means respectively connected to the trigger electrodes in each group of SCR's and their associated gate means all having their first inputs coupled to the same sensing means output; and the second inputs to the various gate means being coupled to the phase-sensing means to be enabled successively in the order of the power-line phase sequence.

11. In a system as set forth in cltim 10, the system having six phase-sensing means corresponding with the two possible polarities of the three phases, and the second inputs of three of the gate means being coupled to each phase sensing means, each such three gate means respectively controlling one SCR at each armature terminal and the three SCR's being similarly poled and all coupled to the same power line phase.

References Cited
UNITED STATES PATENTS

| 2,193,914 | 3/1940 | Alexanderson | 318—138 |
| 2,193,932 | 3/1940 | Mittag | 318—138 |
| 2,214,563 | 9/1940 | Mittag | 318—138 X |
| 2,225,360 | 12/1940 | Willis | 318—138 |

ORIS L. RADER, *Primary Examiner.*

G. SIMMONS, *Assistant Examiner.*

U.S. Cl. X.R.

318—254